(12) United States Patent
Del Vecchio

(10) Patent No.: US 12,092,165 B2
(45) Date of Patent: Sep. 17, 2024

(54) HUB FOR A SERVO CLUTCH WITH SLIPPER FUNCTION OF A HANDLEBAR VEHICLE

(71) Applicant: STM ITALY S.R.L., Turin (IT)

(72) Inventor: Sabino Del Vecchio, Turin (IT)

(73) Assignee: STM ITALY S.R.L., Turin (IT)

( * ) Notice: Subject to any disclaimer, the term of this patent is extended or adjusted under 35 U.S.C. 154(b) by 0 days.

(21) Appl. No.: 18/040,428

(22) PCT Filed: Aug. 4, 2021

(86) PCT No.: PCT/IB2021/057162
§ 371 (c)(1),
(2) Date: Feb. 3, 2023

(87) PCT Pub. No.: WO2022/029654
PCT Pub. Date: Feb. 10, 2022

(65) Prior Publication Data
US 2023/0296139 A1    Sep. 21, 2023

(30) Foreign Application Priority Data
Aug. 5, 2020  (IT) .................. 102020000019387

(51) Int. Cl.
*F16D 13/56* (2006.01)
*F16D 23/12* (2006.01)
*F16D 13/74* (2006.01)

(52) U.S. Cl.
CPC ............. *F16D 13/56* (2013.01); *F16D 23/12* (2013.01); *F16D 2013/565* (2013.01); *F16D 13/74* (2013.01)

(58) Field of Classification Search
CPC .......... F16D 13/56; F16D 23/12; F16D 13/74; F16D 2013/565; F16D 2023/123;
(Continued)

(56) References Cited

U.S. PATENT DOCUMENTS 11,255,385 B2 *  2/2022  Morone .................. F16D 13/75
2010/0163361 A1 *  7/2010  Suzuta ..................... F16D 13/56
192/32

(Continued)

FOREIGN PATENT DOCUMENTS

DE       102017103023 A1    8/2018

OTHER PUBLICATIONS

Machine translation of DE102017103023A1 (Year: 2018).*

*Primary Examiner* — Jacob S. Scott
*Assistant Examiner* — Farhana Pervin
(74) *Attorney, Agent, or Firm* — Bayramoglu Law Offices LLC

(57) ABSTRACT

A hub unit for a clutch of a vehicle with a handlebar has both a servo function when closing and a slipper function via the sliding motion of at least one pin along respective inclined and facing tracks. The hub unit includes a hub connected to an output shaft of a vehicle engine and having an axis of rotation, a plurality of guides rigidly connected to the hub, an axial stop rigidly connected to the hub, a disc pressure flange movable in a direction parallel to the guides, and at least one spring. The hub defines at least a first track and a second track facing in an axial direction and arranged in a direction not parallel to the axis of rotation. The disc pressure flange includes at least one pin projecting in a substantially radial direction and arranged in contact with the first track and the second track.

11 Claims, 3 Drawing Sheets

(58) Field of Classification Search
CPC ........ F16D 13/52; F16D 7/027; F16D 13/644; F16D 13/646; F16D 2013/706; F16D 13/70
See application file for complete search history.

(56) References Cited

U.S. PATENT DOCUMENTS

| | | |
|---|---|---|
| 2017/0122434 A1 | 5/2017 | Imafuku |
| 2017/0159725 A1* | 6/2017 | Imanishi ................. F16D 13/52 |
| 2018/0223917 A1 | 8/2018 | Saito et al. |
| 2019/0226531 A1* | 7/2019 | Youngwerth ......... F16D 13/644 |
| 2020/0072298 A1* | 3/2020 | Roqueta ................ F16D 13/648 |

* cited by examiner

HUB FOR A SERVO CLUTCH WITH SLIPPER FUNCTION OF A HANDLEBAR VEHICLE

CROSS REFERENCES TO THE RELATED APPLICATIONS

This application is a national phase of International Patent Application No. PCT/IB2021/057162 filed on Aug. 4, 2021, which claims priority based on Italian patent application 102020000019387 filed on Aug. 5, 2020. The disclosures of the applications are hereby incorporated by reference in their entireties.

TECHNICAL FIELD

The present invention relates to a hub unit of a clutch for a vehicle with handlebar, for example a two, three or four-wheeled street bike, or a snow mobile or the like which has both a servo function to aid in closure of the clutch via the action of the relative spring; and to automatically open the clutch when, for example following braking at the end of a straight path at high speed, an inertia torque of the rear wheel and chain exceeds that of a crankshaft of the engine. In particular, in the first case, the clutch closing spring applies a lower load and it is therefore easier to open the clutch for a user who manually operates a corresponding lever on the handlebar. In the second case, the clutch has a counter-torque limiting function, i.e. the drive torque applied by the drive wheel to the crankshaft and opens when the counter-torque exceeds a pre-defined limit.

BACKGROUND

It is known to incorporate the servo and slipper functions in a hub group by means of teeth with flat inclined faces arranged in contract with each other in relative motion. However, this results in wear and a consequent relatively short service life of the hub unit. Furthermore, the flat inclined faces are conjugated and therefore each model of the clutch unit requires specific elements without therefore achieving great advantages thanks to economies of scale. Furthermore, the conjugate faces are made by casting and this prevents precise tolerances causing initial wear of a certain entity.

SUMMARY

The scope of the present invention is to present a hub unit for a clutch of a vehicle with handlebar without the drawback specified above.

The scope of the present invention is achieved by means of a servo hub unit with slipper function for a clutch of a vehicle with a handlebar comprising:

A hub adapted to be connected to an output shaft of a vehicle engine and having an axis of rotation;

A plurality of guides configured to allow translation and block to rotation a plurality of friction discs, the guides being rigidly connected to the hub;

An axial stop for the plurality of friction discs rigidly connected to the hub;

A movable disc pressure flange in a direction parallel to the guides to press the plurality of discs against the stop or to release the plurality of discs from the stop;

At least one spring to press the flange towards the stop and arranged against a stop rigidly connected to the hub; wherein the hub defines at least a first and a second track facing in an axial direction and arranged in a direction not parallel to the axis of rotation and the flange comprises at least one pin projecting in a substantially radial direction and arranged in contact with:

the first track having a first inclination such as to convert a first torque applied to the flange by the discs into a first axial load applied by the flange to press the discs against the stop and have a servo effect when closing the clutch;

the second track having a second inclination such as to convert a second torque applied by the hub into a second axial load applied to move off the flange from the axial stop to disengage the discs and allow a slipper function.

By using a pin fixed to the flange and movable along the first and second tracks, it is possible to create a single flange functioning along tracks of different geometries and therefore different models of the hub unit, e.g. applied to different engines or vehicles, will have an interchangeable flange with the advantage of economy of scale.

Furthermore, through the appropriate choice of materials in contact to define the tracks and the pin, it is possible to lower wear also considering the abundant presence of lubricating oil in use, e.g. the clutch is oil wet. However, it should be noted that dry functioning is possible, for example by using pivot pins by means of rolling bearings and linear rolling guides between hub and pressure flange. Preferably but not exclusively, the pins are either rounded or tapered i.e. converging or diverging, so as to be able to design contact surfaces under load in a manner dependent on the conditions of use. Furthermore, the tracks can be close together so as to approximate and exceed a maximum transversal dimension of the pin and thus reduce the angular play to a minimum during the transition from the slipper function to the servo function and vice versa. This has a beneficial effect on the smoothness of driving perceived by a user, in particular in the transition from servo to slipper operation. For example, a maximum distance between one of the two tracks and the relative pin in contact with the other track is less than or equal to 2 millimeters in the angular position between pins and tracks in which there is an inversion of the torque between the closed clutch and the clutch open in slipper function.

The pin can have cross sections of different shapes, in particular convex and preferably has a substantially circular cross section. This simplifies manufacturing and, through a specific dimensioning e.g. a diameter selected also on the basis of the material used for the pin itself and the tracks, the wear is limited.

According to a preferred embodiment, the first and second tracks are radially internal to the guides. This allows a high compactness in the axial direction i.e. in the direction of the hub rotation axis.

The springs to press the discs against the stop in the closing position of the clutch can be of different types, e.g. coil and preferably washer spring. In the latter case, the weight is light and a number of pieces of the hub unit is relatively small.

According to a preferred embodiment, the flange comprises a plurality of teeth facing the stop and engaging on at least one disc so that the latter applies said first torque. In this way it is possible that the torque transferred up particularly efficiently.

According to a preferred embodiment, in order to reduce wear, the pin is rotatable, preferably by means of a rolling bearing.

According to a preferred embodiment, the flange is carried radially via an external arc surface arranged in contact with an internal arc surface of the hub, the internal and external arc surfaces cooperating in contact and in a relative manner during the movement of the pin along the first or second track and being concentric to define sectors of a circular surface. Such surfaces in relative motion provide an appropriate movement of the pin along the tracks.

According to a preferred embodiment, at least one of the arched surfaces defines an inclined recess with respect to the axis of rotation and continues to favor the distribution of lubricating oil between the arched surfaces. This recess, for example a claw, allows to lubricate the surfaces with an arc of circumference and in relative motion between the hub and the disc pressing flange.

Other advantages of the present invention are discussed in the description and cited in the dependent claims.

BRIEF DESCRIPTION OF THE DRAWINGS

The invention is described below on the basis of non-limiting examples illustrated by way of example in the following figures, which refer respectively to.

DETAILED DESCRIPTION OF THE EMBODIMENTS

Figure 1:
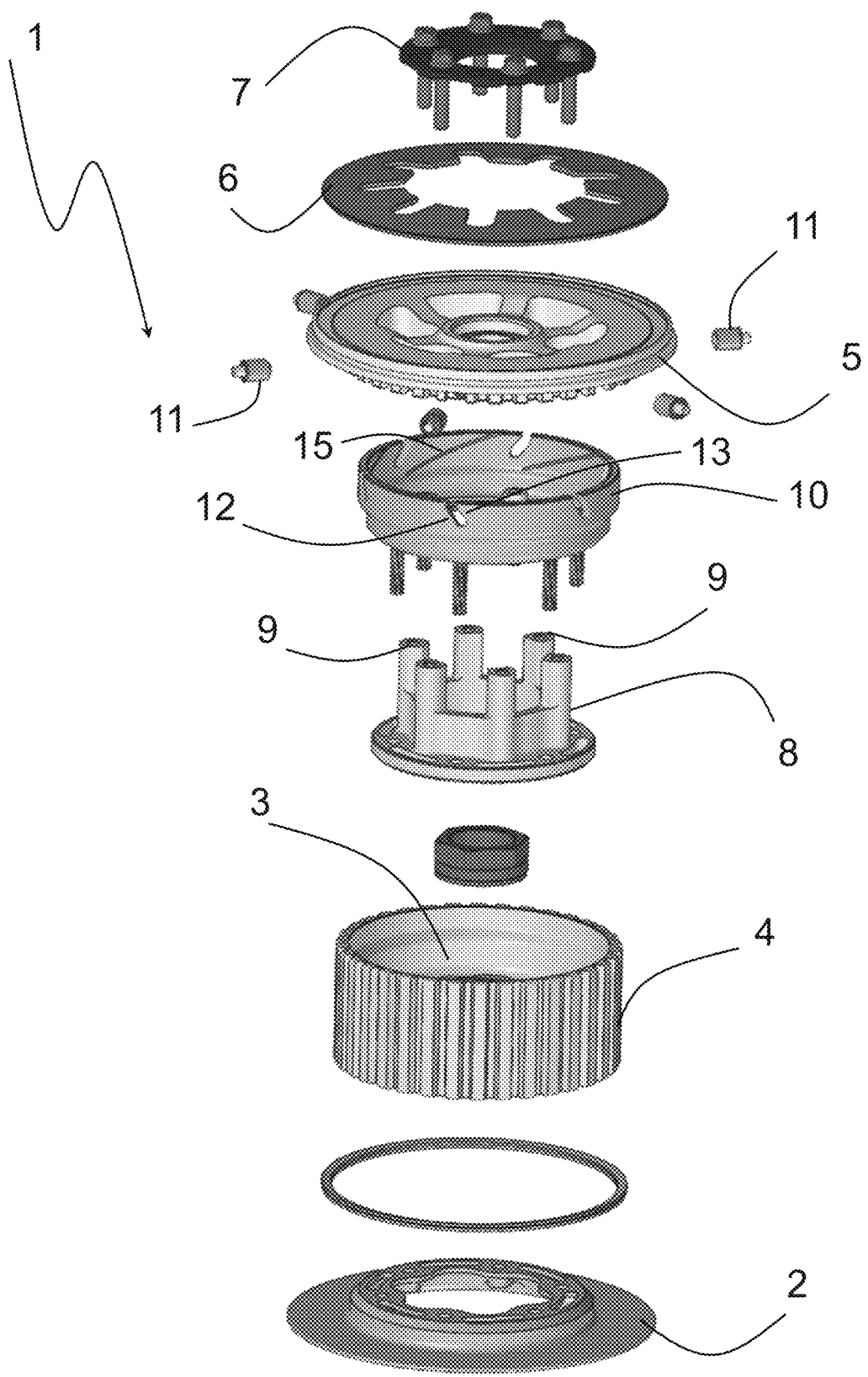
FIG. 1: an exploded perspective view of a hub unit according to the present invention.

In FIG. 1, number 1 shows as a whole a hub unit for a clutch further comprising a bell (not shown) connected in use to one or more rear traction wheels of a vehicle with a handlebar. The hub unit 1 can be supplied both with friction discs (not shown) and in a configuration without discs. The latter cooperate selectively with a plurality of friction discs carried by the bell to connect in torque transmission or disconnect the motor and the traction wheel from rotation.

According to the embodiment of FIG. 1, hub unit 1 comprises an axial stop flange 2, a hub 3 for rotating connection with a crankshaft of the engine and a plurality of guides 4, for example a ring gear cooperating with the friction discs to provide a rigid coupling to rotation and sliding coupling along the guides. In particular, flange 2 is a piece different from hub 3 and guides 4 form a single body with hub 3 but other configurations are possible. For example, flange 2, hub 3 and guides 4 can be a single piece, e.g. made by casting and co-molding.

The hub unit 1 also comprises a disc pressure flange 5 movable parallel to an axis of rotation of hub 3, a spring 6 preferably a washer spring loaded to bring the disc pressure flange 5 closer to stop flange 2, an abutment 7 having an axial fixed position with respect to hub 3 and defining a constraint for axially loading spring 6. In particular, abutment 7 is rigidly connected to hub 3 by means of a spacer structure 8 preferably comprising a plurality of columns 9 extending axially between hub 3 and abutment 7. Disc pressure flange 5, as will be described in greater detail below, rotates with respect to hub 3 in addition to translating and for this purpose it is supported radially to guide the roto-translational movement on an internal surface of sliding bearing 10. The latter has, as shown in the figure, a cylindrical internal surface or a plurality of coaxial arc surfaces so as to define an adequate radial support. However, a dual configuration is possible wherein the bearing has external arc surfaces on which internal arc surfaces carried by flange 5 move. As shown in the figures, the arc surfaces can identify, in their complex, cylindrical surfaces. The sliding bearing 10 is rigidly connected to hub 3 as an insert according to the illustrated embodiment or it can be made in a single body with hub 3 and/or optionally with guides 4 and/or with stop flange 2. The sliding bearing 10 is surrounded by guides 4 and is therefore radially internal to the latter.

Figure 4:
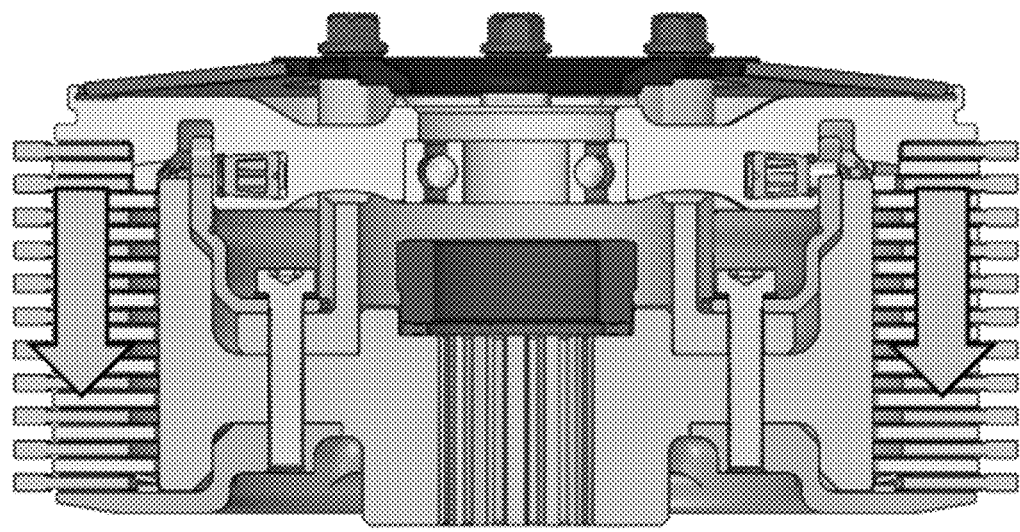
FIGS. 4 and 5: sections in two different operating conditions i.e. assisted closing and slipper opening respectively.
Figure 5:
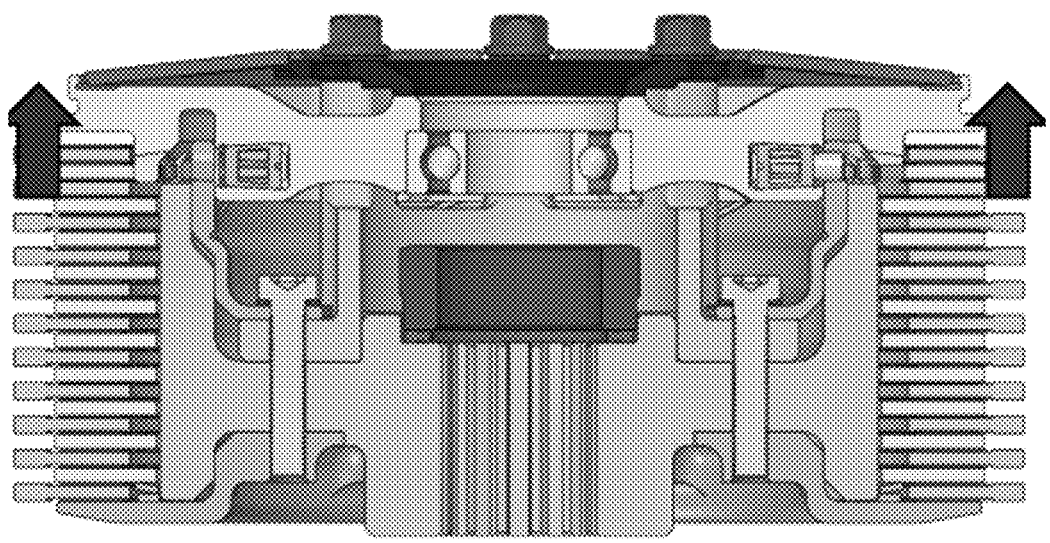

According to an important aspect of the present invention, tracks are formed fixed to hub 3 inclined with respect to the axis of rotation and the disc pressure flange 5 comprises at least one pin 11, preferably a plurality of angularly equispaced pins, movable along the tracks to guide the approach by roto-translation of flange 5 to flange 2 in order to close the clutch in a servo manner by applying an additional axial force to that of spring 6 (FIG. 4) when a lever on the handlebar is released and to open by roto-translation of flange 5 the clutch when an inertial torque comprising that of the rear wheel exceeds the torque of the driving shaft, for example after a sudden deceleration of the engine at the end of a straight path at high speed.

Figure 2:
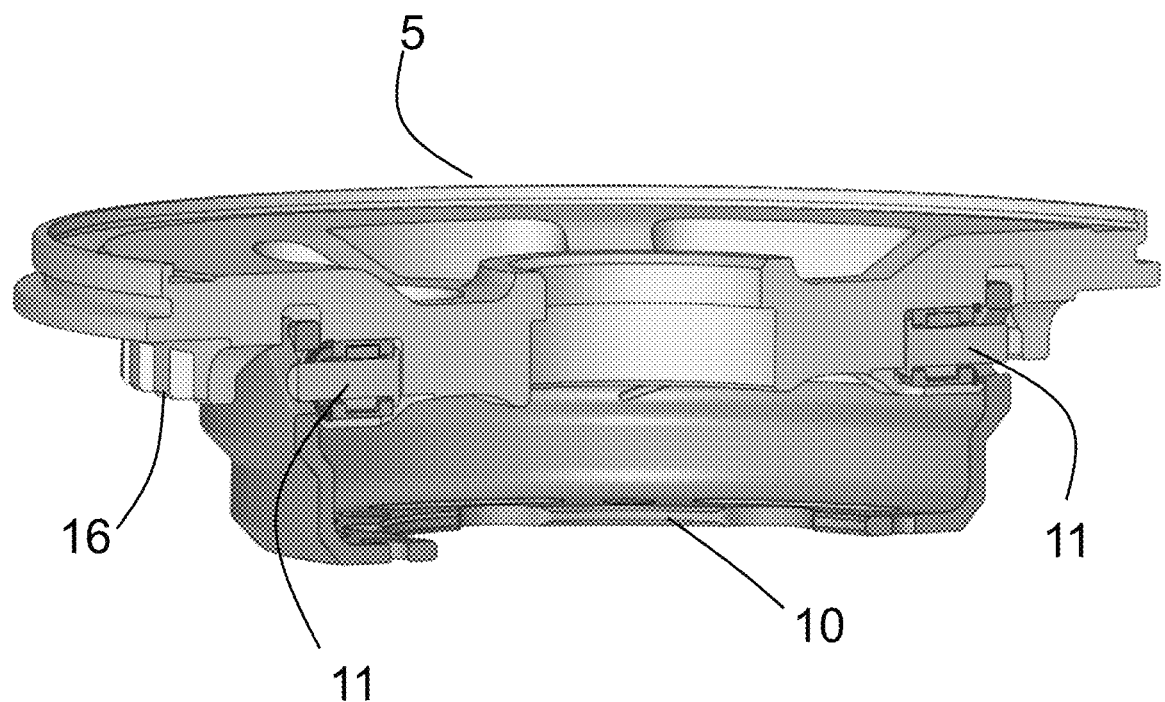
FIG. 2: a partially sectioned perspective view of some components illustrated in FIG. 1.
Figure 3:
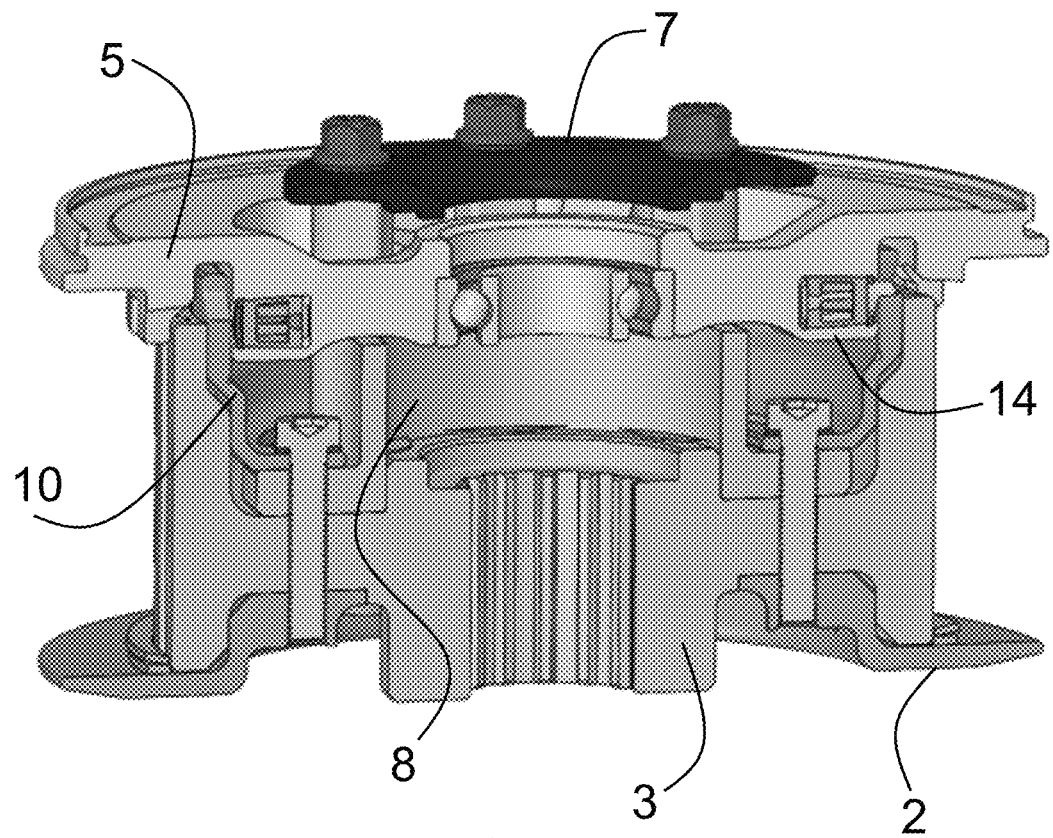
FIG. 3: a section of the hub unit on a plane comprising an axis of rotation of the hub itself.

Preferably, the tracks are made on bearing 10 by inner and outer arched surfaces, and in the embodiment in the figure they are inclined to generate a clockwise rotation for the opening (inner arched surface 12) and anticlockwise for the closing (outer arched surface 13) of the clutch. Inner and outer arched surfaces 12, 13 cooperating with a single pin 11 are preferably facing and spaced so that a maximum play with the pin does not exceed 2 millimeters in the angular position between pins 11 and inner and outer arched surfaces 12, 13 when the clutch is closed. Pin 11 may have a cross section with radii of curvature designed to decrease the contact pressure with inner and outer arched surfaces 12, 13 and, consequently, the wear. According to a preferred embodiment, pin 11, which extends radially cantilevered, is rotatable around its own axis by means of a rolling bearing 14 (FIG. 2) in order to minimize friction during movement on the inner and outer arched surfaces 12, 13. In this way, it is possible to use hub unit 1 also dry and not only wet in lubricating oil. In order to improve the lubrication between bearing 10 and flange 5, at least one of the internal or external arc/circumferential surfaces has a continuous recess 15 to house a predefined quantity of lubricating oil.

According to the embodiment in the figure, the axial closing force additional to that of the spring 6 (FIG. 4) is generated by converting the torque of at least one friction disc rigidly connected to rotation to the pressure flange 5 by means of a connection rigid to rotation and, preferably, also free to translation parallel to the rotation axis. For example, this connection is implemented by means of a toothing 16.

The unit is mounted in accordance to general practice on the handlebar vehicle, e.g. a motorcycle, so that the bell is permanently connected e.g. via gear wheels to the motor e.g. via a gearbox and the hub is permanently connected to the drive wheel, e.g. rear wheel, preferably via a chain so that both the wheel and the hub are disconnected from the engine when the clutch is open. The handlebar lever is connected e.g. through a push rod to the hub so that, when the lever is pulled, the rod counteracts the action of the spring 6 and opens the clutch.

According to an embodiment which is not shown, tracks formed by inner and outer arched surfaces 12, 13 converge or have different patterns to achieve particular servo and slipper laws.

The washer spring can be replaced by a plurality of helical springs.

What is claimed is:

1. A servo hub unit with slipper function for a clutch of a handlebar vehicle comprising:
    a hub adapted to be connected to an output shaft of a vehicle engine and having an axis of rotation;
    a plurality of guides configured to provide translation of a plurality of friction discs and to block rotation of the friction discs, wherein the guides are rigidly connected to the hub;
    an axial stop for the friction discs, wherein the axial stop is rigidly connected to the hub;
    a disc pressure flange movable in a direction parallel to the guides to press the friction discs against the axial stop or release the friction discs from the axial stop;
    at least one spring to press the disc pressure flange towards the axial stop and arranged against a stop rigidly connected to the hub;
    wherein:
        at least a first track is defined by an outer arched surface and a second track is defined by an inner arched surface facing in an axial direction and arranged in a direction not parallel to the axis of rotation;
        the disc pressure flange comprises at least one pin projecting in a substantially radial direction and arranged in contact with the first track and the second track;
        the first track has a first inclination configured to convert a first torque applied to the disc pressure flange by the friction discs into a first axial load applied by the disc pressure flange to press the friction discs against the axial stop and have a servo assisting effect when closing the clutch;
        the second track has a second inclination configured to convert a second torque applied by the hub into a second axial load applied to distance the disc pressure flange from the axial stop to disengage the friction discs and allow a slipper function.

2. The servo hub unit according to claim 1, wherein the pin has a substantially circular cross section.

3. The servo hub unit according to claim 1, wherein the first track and the second track are radially internal to the guides.

4. The servo hub unit according to claim 1, wherein the spring is a washer spring.

5. The servo hub unit according to claim 1, wherein the disc pressure flange comprises a plurality of teeth facing the axial stop and engaging on at least one disc so that the at least one disc applies the first torque.

6. The servo hub unit according to claim 1, wherein the pin is rotatable about a radial axis of the pin.

7. The servo hub unit according to claim 6, wherein the pin is rotatable by means of a rolling bearing.

8. The servo hub unit according to claim 1, wherein the first and second tracks defined by the outer arched surface and the inner arched surface cooperate in contact and in a relative manner during movement of the pin along the first track or the second track.

9. The servo hub unit according to claim 8, wherein at least one of the inner arched surface and the outer arched surface defines an inclined recess with respect to the axis of rotation to promote distribution of lubricating oil between the inner arched surface and the outer arched surface.

10. The servo hub unit according to claim 1, comprising a lever adapted to be mounted on a handlebar of a vehicle and functionally connected to the spring to release an action of the disc pressure flange by opposing the spring when the lever is pulled by a hand of a driver and open the clutch.

11. A handlebar vehicle comprising the servo hub unit according to claim 1, wherein the hub is connected to a traction wheel of the handlebar vehicle, and the traction wheel is disconnected from the vehicle engine of the handlebar vehicle when the clutch is open.

* * * * *